United States Patent [19]

Miller et al.

[11] 4,285,896

[45] Aug. 25, 1981

[54] ISOSTATIC MOLDING PROCESS AND SEAL

[75] Inventors: Arnold B. Miller, Pinconning; Herman F. Casper, Bay City, both of Mich.

[73] Assignee: The Dow Chemical Company, Midland, Mich.

[21] Appl. No.: 803,923

[22] Filed: Jun. 6, 1977

[51] Int. Cl.³ ............................................. B29C 3/00
[52] U.S. Cl. .................................. 264/127; 264/269; 264/314; 277/207 R; 277/213; 277/215
[58] Field of Search ................ 264/269, 314, 127, 84; 277/207 R, 166, 213, 215, 235 B; 285/328, 363, 368, DIG. 18, DIG. 19

[56] References Cited

U.S. PATENT DOCUMENTS

| Re. 25,241 | 9/1962 | Randolph | 264/314 X |
|---|---|---|---|
| 1,233,169 | 7/1917 | Berry . | |
| 2,292,845 | 8/1942 | Pratt . | |
| 2,858,156 | 10/1958 | Wooton | 277/166 X |
| 2,977,269 | 3/1961 | Nerwick | 264/314 X |
| 3,137,898 | 6/1964 | Geringer | 264/314 |
| 3,158,380 | 11/1964 | Carrell . | |
| 3,177,105 | 4/1965 | Wiltshire | 264/314 X |
| 3,216,745 | 11/1965 | Oey . | |
| 3,339,950 | 9/1967 | Grove | 277/177 X |
| 3,937,781 | 2/1976 | Allen | 264/269 X |
| 4,017,576 | 4/1977 | Freed | 264/127 X |

FOREIGN PATENT DOCUMENTS 446521 2/1948 Canada .

Primary Examiner—Thomas P. Pavelko
Attorney, Agent, or Firm—R. B. Ingraham

[57] ABSTRACT

In the isostatic molding of linings, an improved flange-to-flange seal is obtained when a generally rectangular ring is employed in a generally rectangular groove.

4 Claims, 2 Drawing Figures

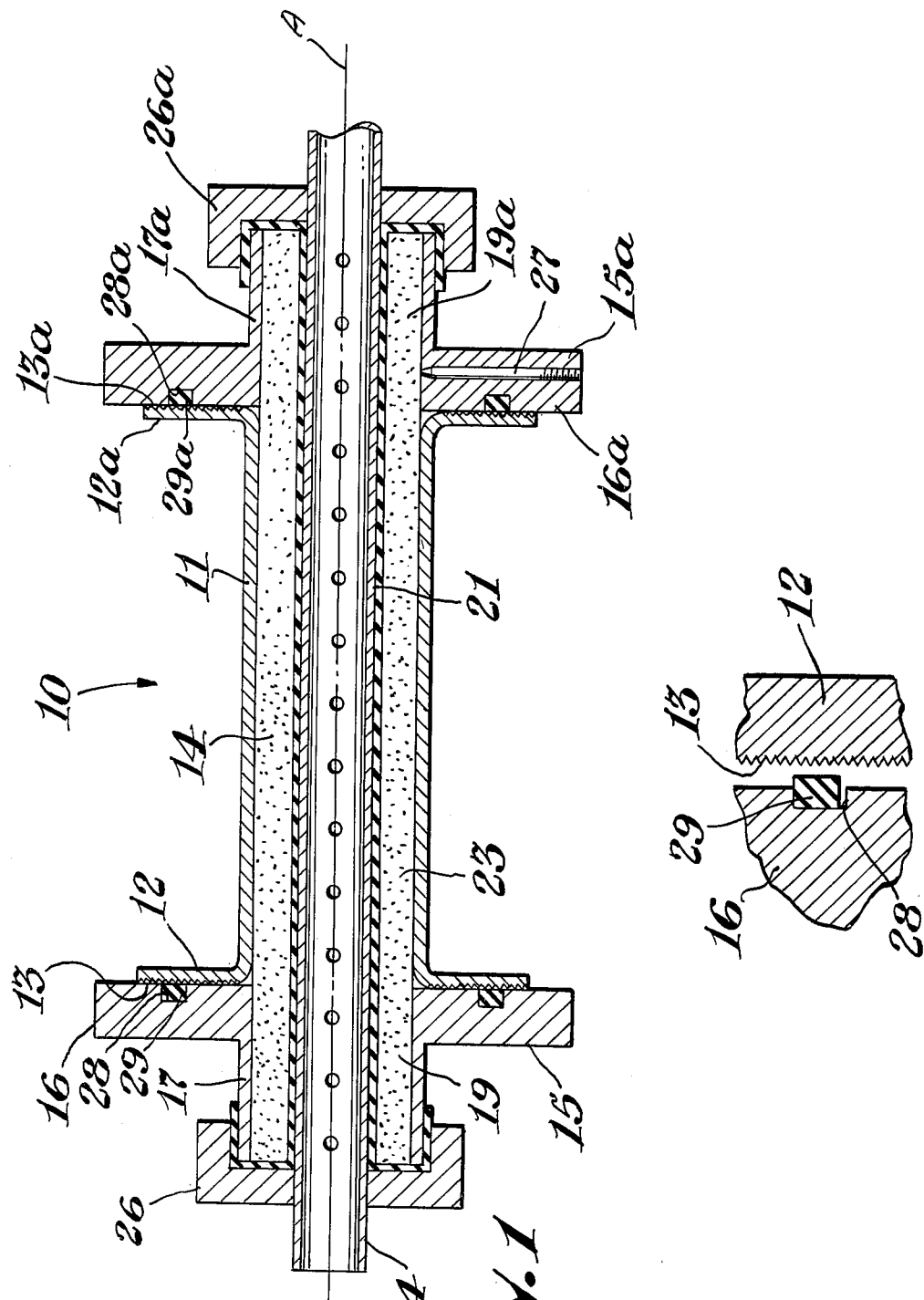

ISOSTATIC MOLDING PROCESS AND SEAL

In the isostatic molding or pressing of plastic-lined articles by means of disposing a flexible member or bag within the article, disposing synthetic resinous powder to be compacted between the article and bag, for example, in the preparation of a flanged piping spool or other pipe fitting, O-rings generally have been employed as sealing members. Such O-rings have not provided the desired degree of seal reliability, oftentimes permitting hydraulic fluid to intrude into the powder being compacted. Flat-faced gaskets have also been employed for sealing such flanged joints, but with varying degrees of success. Generally, in an isostatic molding procedure, it is desirable that seals be able to withstand external pressures of from 5,000 to 10,000 psi without hydraulic leakage. Oftentimes, such flanges on piping components or pipe fittings are formed by rolling, that is, flaring the pipe itself until the desired flange form is obtained. Because of the propensity of plastics such as polytetrafluoroethylene to cold flow and shrink, it is desirable that the face of the flange on the fitting be knurled in order to minimize cold flow. Oftentimes such knurling is in the form of a plurality of generally coaxial V-shaped grooves. Due to the production, processing and handling procedures employed with pipe fittings to be lined, extreme dimensional uniformity usually is not found. Minor deformation generally is initially present when the part is made. Other deformations frequently occur due to handling procedures. Once a lining of a material such as polytetrafluoroethylene is formed in a fitting, generally the lining projects outwardly at each connection opening of the fitting. This projecting lining is deformed by flaring outwardly to form a lining on the flange which lies against the metal fitting flange. In the preparation of such linings, it is necessary that an excellent and reliable seal be obtained during the isostatic compression of the plastic lining. When employing O-rings to form such flanged flange seals, it is frequently necessary to reshape the fitted flange by means of a file. Such an operation is undesirable, time-consuming and expensive. The reliability of the seal is to a large part dependent on the man filing the flange and his judgement. In a fitting such as a Tee, there are three openings each having a flange. Each flange must be carefully flattened by means of a file to receive an O-ring. A defect in any one of these flanges results in an improper seal, intrusion of the hydraulic liquid to the powder being pressed and another fitting is scrapped.

It would be desirable if there were available an improved isostatic molding seal.

It would also be desirable if there were available an improved isostatic molding process.

It would also be desirable if there were available a seal which provided a reliable flange-to-flange seal without substantial leakage.

These features and other advantages in accordance with the present invention are achieved in a process for the isostatic forming of plastic liners within hollow bodies having generally flat-faced flanges disposed about openings thereof, the method comprising providing a flanged hollow body to be lined, the body having at least one generally flat-faced flange, the flange having a generally radially extending planar surface having a generally centrally disposed opening therein, disposing within the body a powder to be compacted to form a lining, disposing a flexible membrane within the body and the powder to be compacted, the flexible membrane maintaining the powder in a desired position, supporting and sealing the membrane adjacent the flanged opening of the article with a flanged end cap, hydraulically sealing the flexible member to said end cap and subsequently immersing the body in a hydraulic liquid and applying pressure thereto sufficient to compact the powder to a desired degree, subsequently removing the end cap and flexible member to provide a compacted powder-lined body, the improvement which comprises providing an end cap having an annular recess formed in a mating surface thereof, the recess having a radial cross-sectional configuration which is generally rectangular, disposing a generally resilient liquid impervious annular sealing member within said groove, the annular sealing member having a radial, generally rectangular configuration such that when the sealing member is disposed within the groove, the sealing member projects therefrom and when the flanges of the end cap and article to be lined are forced into contact, the sealing ring is deformed to fill the groove and any adjacent irregularities in an adjacent portion of the flange of the body to be lined.

Also contemplated within the scope of the invention is a conduit joint, the conduit joint comprising a first conduit having a first end and a second conduit having a second end, the first and second ends having flanges, the flanges defining generally planar radially extending mating surfaces, the second end mating surface having defined therein an annular groove, the annular groove having a generally rectangular cross-sectional configuration in a radial direction, a resilient sealing ring disposed within the annular groove, the sealing ring being deformed to fill the groove by the pressing of the first and second mating surfaces together to thereby form a hydraulic seal.

Further features and advantages in accordance with the present invention will become more apparent from the following specification taken in connection with the drawing wherein:

FIG. 1 depicts a sectional view of an isostatic molding assembly in accordance with the invention; and FIG. 2 is a fractional, sectional view of a sealing cap fitting flange and seal member in accordance with the invention.

In FIG. 1 there is schematically depicted a sectional view of a molding assembly in accordance with the present invention generally designated by the reference numeral 10. The assembly 10 comprises in cooperative combination a spool piece 11 of steel pipe or conduit having a first terminal flange 12 disposed at one end thereof. The flange 12 has a generally radially extending planar annular sealing face 13. At the opposite end of the spool piece 11 is disposed a like flange 12a having a sealing face 13a. The spool piece 11 has formed therein a generally cylindrical cavity 14 extending entirely therethrough. The spool piece 11 is of rotational symmetry about the axis A. A first end cap or terminal molding member 15 is disposed adjacent face 13 of flange 12. The molding member or cap 15 is in effect a short length of pipe or conduit having a flange portion 16 which is of generally like dimensions to the flange 12 of the spool piece 11. The cap 15 has a generally cylindrical portion 17 which is outwardly extending away from the spool piece 11. A cylindrical passage 19 is defined within the end cap 15. The passage 19 is generally coaxial with the passage 14 of the spool piece 11. A flexible molding member or rubber tube 21 is generally coaxially disposed within the spool piece 11 and end caps 15 and 15a. Opposite ends of the tube or molding member 21 are stretched and reverse folded over the portions 17 and 17a of the end caps 15 and 15a. A generally annular mass 23 of molding powder is disposed between the tube 21 and the interior surfaces of the spool piece and end cap portions 17 and 17a. A perforate tube 24 extends axially within the assembly 10. Locking caps 26 and 26a are disposed over the ends of the tube 24 and serve to compress adjacent portions of the tube 21 overlying portions 17 and 17a of molding caps 15 and 15a, respectively, to provide liquid-tight seals. In flange 16a is formed a selectively closable passage 27 which serves to vent the gas from the powder annulus 23 prior to immersing the assembly 10 in a suitable vessel and the application of the appropriate hydraulic pressure to compact the powder 23 to a desired density. In FIG. 1 bolts holding flanges 12 and 16 and flanges 12a and 16a together have been omitted for ease of illustration. Other clamping systems may be utilized if desired. Flanges 16 and 16a each have formed therein a generally annular groove 28 and 28a; the grooves are of generally rectangular cross-section, have their major axis in the radial direction and contain a compressed, resilient seal ring 29 and 29a, respectively.

In FIG. 2, there is schematically depicted a sectional, fractional view of a flange such as the flange 16 of FIG. 1 containing the annular groove 28 and a flexible resilient deformable sealing ring 29 spaced apart from the flange 12 and showing the roughened narrow surface 13 of the flange 12. FIG. 2 represents the configuration of the sealing ring 29 within the groove 28 prior to compression by drawing the flanges 12 and 16 together. The sealing ring 29 protrudes from the groove 28 by a distance exceeding the anticipated roughness or depth of knurling on the surface 13 plus a distance sufficient to assure that the groove 28 is filled by the sealing ring when the flanges 16 and 12 are drawn together. The width of the sealing ring 29 is sufficient to extend across at least three and beneficially at least six of the knurled grooves on surface 13.

As a specific example of the present invention, adaptors such as the adaptors 15 and 15a were prepared for use with nominal 4-inch pipe diameter fittings. The groove had an inside diameter of about 4.63 inches. The groove was 0.75 inch in width and had a depth of about 0.188 inch. The inner corners of the groove had about a 0.02 inch radius. The sealing rings used have an inside diameter of 4.562 inches, a thickness of 0.212 inch and a width of 0.625 inch (a distance sufficient to cover about 10 of the knurled grooves on the flange of the fitting). The rings extend 0.025 inch above the face of the flange and a ⅛ inch clearance extends around the outside of the sealing ring in the uncompressed form. Sealing rings have been molded from urethane resins having a 45 A shore hardness and have given excellent service at pressures up to 10,000 psi in lining pipe fittings with polytetrafluoroethylene. Sealing rings cut from ethylene-propylene rubber have also been satisfactory but do not appear as desirable as the molded polyurethane. Other flexible materials such as natural or synthetic rubber may also be used to form seal rings in accordance for the practice of the present invention.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth in the hereto-appended claims.

We claim:

1. In a process for the isostatic forming of plastic liners within hollow bodies having generally flat-faced flanges disposed about openings thereof, the method comprising providing a flanged hollow body to be lined, the body having at least one generally flat-faced flange, the flange having a generally radially extending planar surface and a centrally disposed opening therein, disposing within the body a powder to be compacted to form a lining, disposing a flexible membrane within the body and the powder to be compacted, the flexible membrane maintaining the powder in a desired position, supporting and sealing the membrane adjacent the flanged opening of the article with a flanged end cap, hydraulically sealing the flexible member to said end cap and subsequently immersing the body in a hydraulic liquid and applying pressure thereto sufficient to compact the powder to a desired degree, subsequently removing the end cap and flexible member to provide a compacted-powder lined body, the improvement which comprises providing an end cap having an annular recess formed in a mating surface thereof, the recess having a radial cross-sectional configuration which is generally rectangular, disposing a generally resilient liquid impervious annular sealing member within said groove, the annular sealing member having a radial, generally rectangular configuration such that when the sealing member is disposed within the groove, the sealing member projects therefrom and when the flanges of the end cap and article to be lined are forced into contact, the sealing ring is deformed to fill the groove and any adjacent irregularities in the flange of the body to be lined.

2. The process of claim 1 wherein the flange of the hollow body has knurling formed on the mating surface thereof in the form of a plurality of concentric grooves.

3. The method of claim 2 wherein the sealing member extends across at least three of said concentric grooves.

4. The method of claim 3 wherein the sealing member extends across at least six of the concentric grooves.

* * * * *